US011197318B2

(12) United States Patent
Hong et al.

(10) Patent No.: US 11,197,318 B2
(45) Date of Patent: Dec. 7, 2021

(54) METHOD AND APPARATUS FOR TRANSMITTING SYSTEM INFORMATION

(71) Applicant: BEIJING XIAOMI MOBILE SOFTWARE CO., LTD., Beijing (CN)

(72) Inventors: Wei Hong, Beijing (CN); Juejia Zhou, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 34 days.

(21) Appl. No.: 16/236,234

(22) Filed: Dec. 28, 2018

(65) Prior Publication Data

US 2019/0141746 A1    May 9, 2019

Related U.S. Application Data

(63) Continuation of application No. PCT/CN2016/087908, filed on Jun. 30, 2016.

(51) Int. Cl.
*H04W 74/08* (2009.01)
*H04W 48/08* (2009.01)
*H04W 48/14* (2009.01)
*H04W 76/11* (2018.01)
*H04W 72/04* (2009.01)

(52) U.S. Cl.
CPC ....... *H04W 74/0808* (2013.01); *H04W 48/08* (2013.01); *H04W 48/14* (2013.01); *H04W 72/046* (2013.01); *H04W 74/0833* (2013.01); *H04W 76/11* (2018.02)

(58) Field of Classification Search
CPC . H04W 74/0808; H04W 48/08; H04W 48/14; H04W 76/11; H04W 72/046; H04W 74/0833; H04W 74/004; H04W 74/006; H04W 74/002; H04W 74/08; H04W 16/28
USPC ....................................................... 370/329
See application file for complete search history.

(56) References Cited

U.S. PATENT DOCUMENTS

| 2010/0120452 A1 | 5/2010 | Somasundaram et al. |
| 2014/0355539 A1 | 4/2014 | Yang et al. |
| 2015/0245282 A1 | 8/2015 | Kim |

(Continued)

FOREIGN PATENT DOCUMENTS

| CN | 102625461 A | 8/2012 |
| CN | 102892192 A | 1/2013 |

(Continued)

OTHER PUBLICATIONS

International Search Report (including English translation) and Written Opinion issued in PCT/CN2016/087908, dated Mar. 17, 2017, 8 pages.

(Continued)

*Primary Examiner* — Hassan A Phillips
*Assistant Examiner* — Mohammed S Chowdhury
(74) *Attorney, Agent, or Firm* — Arch & Lake LLP

(57) ABSTRACT

A method for transmitting system information includes: sending, in a random access process, a random access message III carrying a system information request to a base station, where the system information request is used to request for system information; receiving a random access message IV carrying the system information and sent by the base station; and reading the system information from the random access message IV.

8 Claims, 7 Drawing Sheets

(56) References Cited

U.S. PATENT DOCUMENTS

| | | | |
|---|---|---|---|
| 2015/0382284 A1 | 12/2015 | Brismar | |
| 2017/0019930 A1* | 1/2017 | Lee | H04W 72/0413 |
| 2017/0251500 A1* | 8/2017 | Agiwal | H04W 74/0833 |
| 2017/0295489 A1* | 10/2017 | Agiwal | H04W 12/108 |
| 2017/0311285 A1* | 10/2017 | Ly | H04W 74/0833 |
| 2018/0184461 A1* | 6/2018 | Zhang | H04W 72/042 |

FOREIGN PATENT DOCUMENTS

| | | | |
|---|---|---|---|
| CN | 103973412 A | 8/2014 | |
| CN | 106171011 A | 11/2016 | |
| EP | 3419340 A1 | 12/2018 | |
| EP | 3457763 A1 | 3/2019 | |
| JP | 2019511166 A | 4/2019 | |
| KR | 1020110120296 A | 11/2011 | |
| RU | 2477587 C2 | 9/2012 | |
| WO | 2011116242 A1 | 9/2011 | |
| WO | 2012150883 A1 | 8/2012 | |
| WO | 2014042468 A | 3/2014 | |
| WO | 2014177092 A1 | 11/2014 | |
| WO | 2015094057 A1 | 6/2015 | |
| WO | 2017150863 A1 | 9/2017 | |
| WO | 2017195478 A1 | 11/2017 | |

OTHER PUBLICATIONS

Catt, "On-Demand System Information Delivery Mechanism," 3GPP TSG-RAN-164811, WGS#95 R2-164881 Aug. 22-26, 2016, Gothenburg, Sweden, 6 pages.
Catt, "On-Demand System Information Delivery Mechanism," 3GPP TSG-RAN-164811, WGS#96 R2-167980 Nov. 14-18, 2016, Reno, Nevada, 5 pages.
European Extended Search Report issued in EP16906738.6, dated Oct. 17, 2019, 14 pages.
Huawei, HiSilicon, "Further Considerations of "Other Si"," 3GPP TSG-RAN2 Meeting #96, R2-167580, Nov. 14-18, 2016, Reno, Nevada, 7 pages.
Intel Corporation: "System information for standalone NR deployment", 3Gpp Draft; R2-163586, 3rd Generation Partnership Project (3GPP), Mobile Competence Centre ; 650, Route Des Lucioles ; F-06921 Sophia-Antipolis Cedex ; France, vol. RAN WG2, No. Nanjing, China; May 23, 2016-May 27, 2016 May 22, 2016 (May 22, 2016), XP051105035.
Japanese Office Action (including English translation) issued in JP App. No. 2018-560936, dated Oct. 4, 2019, 6 pages.
Korean Office Action (including English translation) issued in KR App. No. 10-2018-7029915, dated Nov. 25, 2019, 9 pages.
Russian Office Action (including English translation) issued in RU App. No. 201900801/08(001314), dated Sep. 26, 2019, 13 pages.
Samsung: "Preliminary view on Initial Access in 5G", 3GPP Draft; R2-162300, 3rd Generation Partnership Project (3GPP), Mobile Competence Centre ; 650, Route Des Lucioles ; F-06921 Sophia-Antipolis Cedex ; France, vol. RAN WG2, No. Dubrovnik, Croatia; Apr. 11, 2016-Apr. 15, 2016 Apr. 4, 2016 (Apr. 4, 2016), XP051082676.
Samsung: "System Information Signalling Design in NR", 3GPP Draft; R2-163371_System Information Signaling Design in NR, 3rd Generation Partnership Project (3GPP), Mobile Competence Centre ; 650, Route Des Lucioles ; F-06921 Sophia-Antipolis Cedex ; France, vol. RAN WG2, No. Nanjing, China; May 23, 2016-May 27, 2016 May 13, 2016 (May 13, 2016), XP051095809.
ZTE: "Consideration on System Information Broadcast in New RAT", 3GPP Draft; R2-162629 Consideration System Information Broadcast in NR, 3rd Generation Partnership Project (3GPP), Mobile Competence Centre ; 650, Route Des Lucioles ; F-06921 Sophia-Antipolis Cedex; vol. RAN WG2, No. Dubrovnik, Croatia; Apr. 11, 2016-Apr. 15, 2016 Apr. 1, 2016 (Apr. 1, 2016), XP051082193.
First Office Action issued to Chinese Patent Application No. 201680000690.8 dated Sep. 7, 2018 with English translation, (10p).
Huawei, HiSilicon, System Information Design—R2-164127, 3GPP TSG-RAN2 Meeting #94, Nanjing, China, May 23-27, 2016, (5p).
First Indian Office Action issued to Indian Patent Application No. 201937000179 dated Aug. 26, 2020 with English translation, (5p).
Notice of Allowance issued to Korean Patent Application No. 9-5-2020-048380517 dated Jul. 15, 2020 and English translation, (7p).

* cited by examiner

METHOD AND APPARATUS FOR TRANSMITTING SYSTEM INFORMATION

CROSS-REFERENCE TO RELATED APPLICATIONS

The present application is based on and claims the priority of PCT Patent Application No. PCT/CN2016/087908, filed Jun. 30, 2016, the entire contents of which are incorporated herein by reference.

TECHNICAL FIELD

The present disclosure generally relates to the field of communications technologies, and more particularly, to a method and an apparatus for transmitting system information.

BACKGROUND

When accessing a base station, a terminal needs to obtain system information broadcast by the base station, so as to accurately access and select a network provided by the base station according to the system information, thereby obtaining various network services. The system information includes a Master Information Block (MIB), System Information Blocks (SIBs) 1-12, and the like.

With regard to a high-frequency network, for example, a 5th Generation (5G) digital communications network, a frequency range thereof may reach up to 100 GHz, and to satisfy a channel quality requirement needed by high frequency band data, data communication between a base station and a terminal needs to use a beamforming technology. That is, system information is transmitted between the base station and the terminal by using the beamforming technology.

SUMMARY

To resolve problems in the related art, the present disclosure provides a method and an apparatus for transmitting system information.

According to a first aspect of the present disclosure, a method for transmitting system information is provided, and the method includes: sending, in a random access process, a random access message III carrying a system information request to a base station, where the system information request is used to request for system information; receiving a random access message IV carrying the system information and sent by the base station; and reading the system information from the random access message IV.

According to a second aspect of the present disclosure, a method for transmitting system information is provided, and the method includes: receiving, in a random access process, a random access message III carrying a system information request and sent by a terminal, where the system information request is used to request for system information; and sending a random access message IV carrying the system information to the terminal, where the random access message IV is used for the terminal to read the system information.

According to a third aspect of the present disclosure, an apparatus for transmitting system information is provided, and the apparatus includes: a first sending module configured to send, in a random access process, a random access message III carrying a system information request to a base station, where the system information request is used to request for system information; a first receiving module configured to receive a random access message IV carrying the system information and sent by the base station; and an information reading module configured to read the system information from the random access message IV obtained by the first receiving module.

According to a fourth aspect of the present disclosure, an apparatus for transmitting system information is provided, and the apparatus includes: a message receiving module configured to receive, in a random access process, a random access message III carrying a system information request and sent by a terminal, where the system information request is used to request for system information; and a first sending module configured to send a random access message IV carrying the system information to the terminal, where the random access message IV is used for the terminal to read the system information.

According to a fifth aspect of the present disclosure, an apparatus for transmitting system information is provided, and the apparatus includes: a processor; a memory configured to store instructions executable by the processor. The processor is configured to: send, in a random access process, a random access message III carrying a system information request to a base station, where the system information request is used to request for system information; receive a random access message IV carrying the system information and sent by the base station; and read the system information from the random access message IV.

According to a sixth aspect of the present disclosure, an apparatus for transmitting system information is provided, and the apparatus includes: a processor; a memory configured to store instructions executable by the processor. The processor is configured to: receive, in a random access process, a random access message III carrying a system information request and sent by a terminal, where the system information request is used to request for system information; and end a random access message IV carrying the system information to the terminal, where the random access message IV is used for the terminal to read the system information.

It shall be understood that the foregoing general descriptions and the detailed descriptions in the following are merely illustrative and cannot limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the invention. Instead, they are merely examples of apparatuses and methods consistent with aspects related to the invention as recited in the appended claims.

Figure 1:
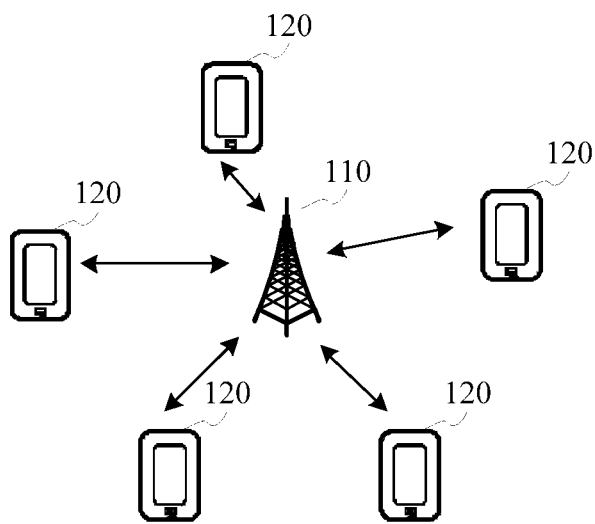
FIG. 1 is a block diagram of a communications system according to an example.

FIG. 1 is a block diagram of a communications system according to an example, where the communications system includes a base station 110 and multiple terminals 120, and data is transmitted between the base station 110 and the terminals 120 by using a high frequency band. For example, the communications system is a 5G system.

The terminal 120 may be a cellphone, a smartphone, a computer, a tablet computer, a wearable device, a Personal Digital Assistant (PDA), a Mobile Internet Device (MID), an e-book reader, or the like.

Figure 2:
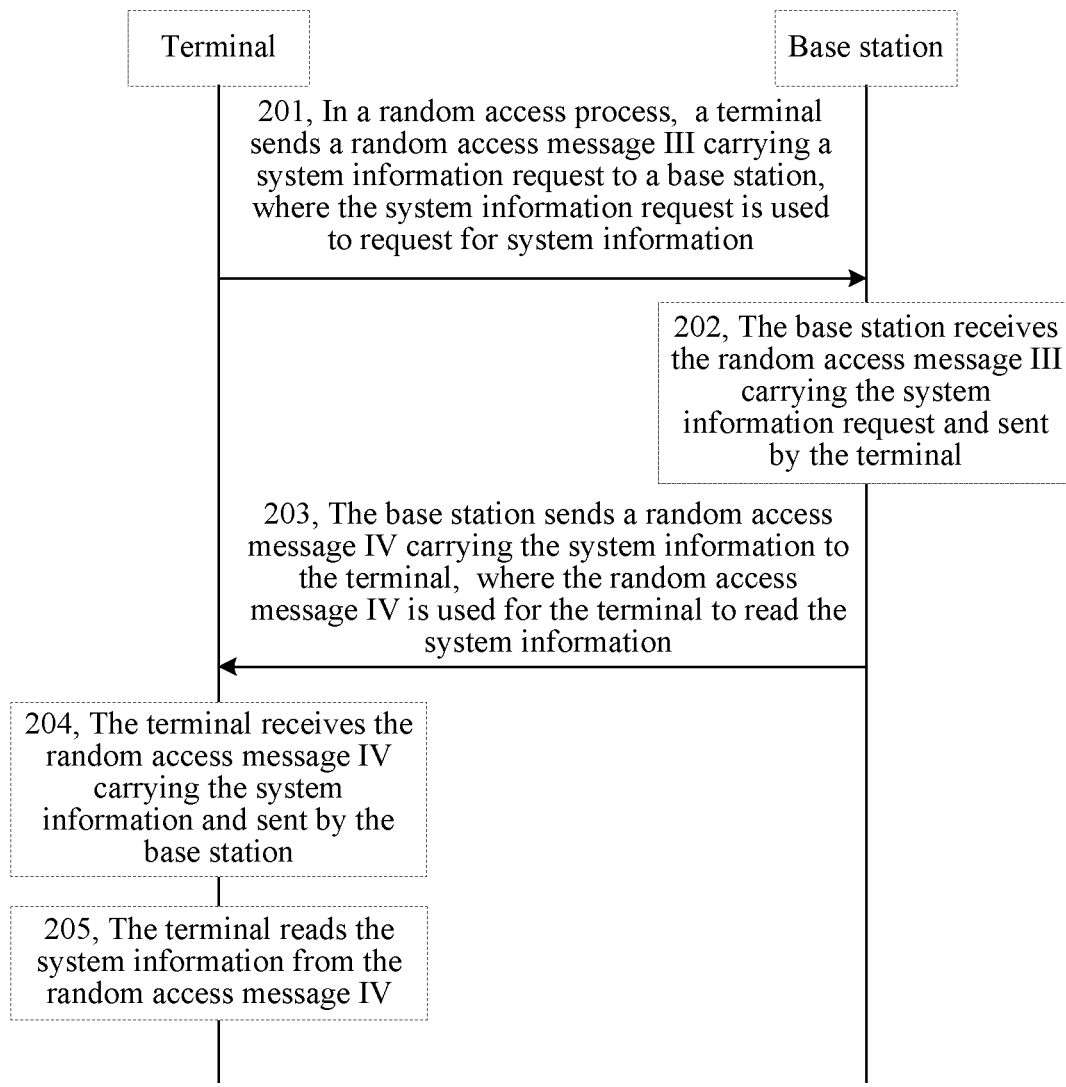
FIG. 2 is a flow chart showing a method for transmitting system information according to an example.

FIG. 2 is a flow chart showing a method for transmitting system information according to an example. The method for transmitting system information may be applied to the communications system shown in FIG. 1, and as shown in FIG. 2, the method for transmitting system information includes the following steps.

Step 201: In a random access process, a terminal sends a random access message III carrying a system information request to a base station, where the system information request is used to request for system information. For example, the terminal may request system information from the base station using the system information request. The random access message III is the third step in the connection contention based random access procedure between the UE and the network, which is Scheduled Transmission from the terminal to the network. When the random access is triggered by initial access, the random access message III may include a RRC connection request.

Step 202: The base station receives the random access message III carrying the system information request and sent by the terminal.

Step 203: The base station sends a random access message IV carrying the system information to the terminal, where the random access message IV is used for the terminal to read the system information. Here, the random access message IV may relate to the fourth step in the contention based random access procedure between the UE and the network, which is Contention Resolution.

Step 204: The terminal receives the random access message IV carrying the system information and sent by the base station.

Step 205: The terminal reads the system information from the random access message IV.

Steps 202 and 203 may be separately implemented as a so-called method for transmitting system information on a base station side, and steps 201, 204, and 205 may be separately implemented as a so-called method for transmitting system information on a terminal side.

In conclusion, according to the method for transmitting system information provided by the present disclosure, a terminal may request a base station for system information by sending a random access message III carrying a system information request to the base station, where the system information request is used to request for the system information. The base station may send a random access message IV carrying the system information to the terminal. And the terminal may read the system information from the random access message IV. The method resolves a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

Figure 3:
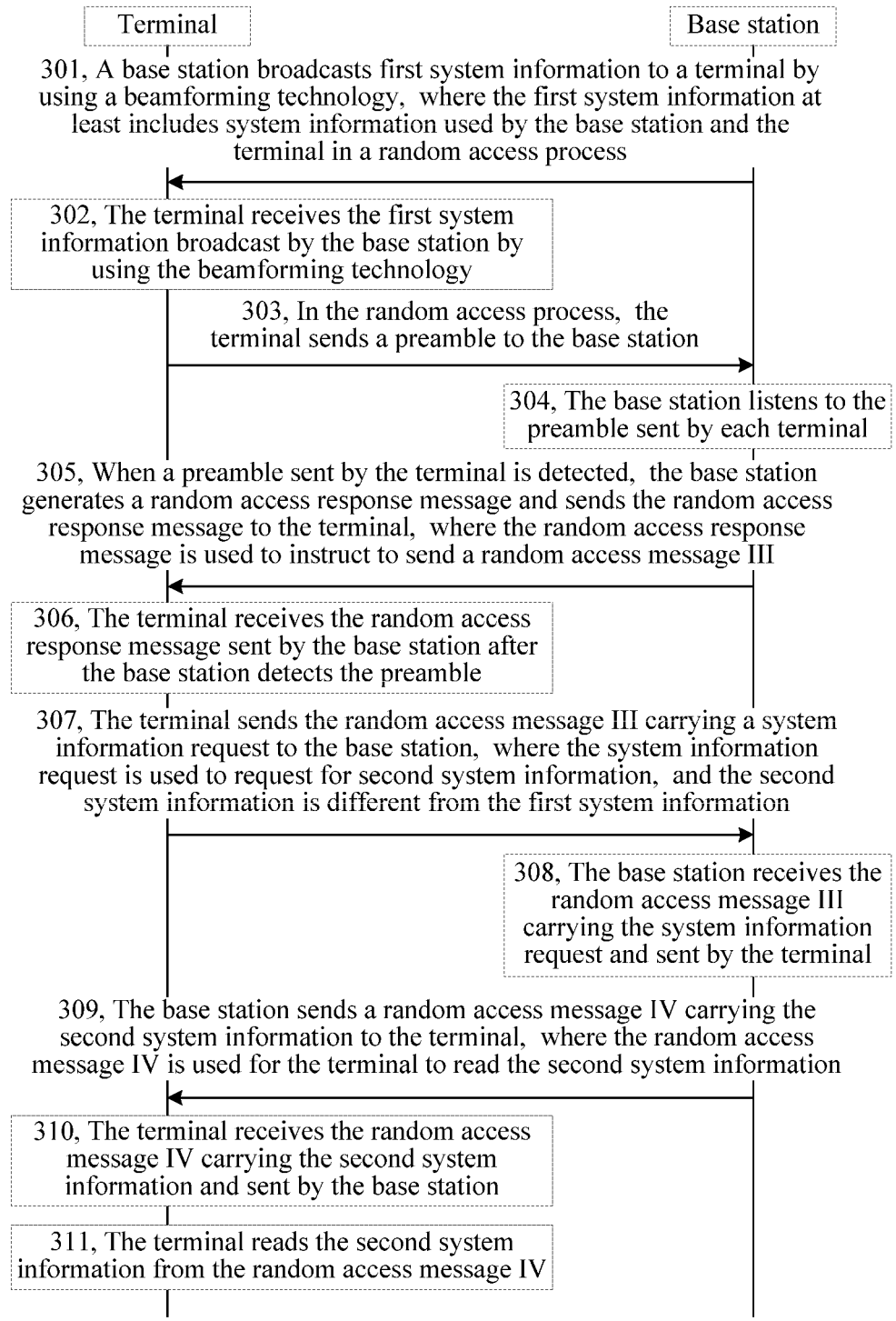
FIG. 3 is a flow chart showing a method for transmitting system information according to another example.

FIG. 3 is a flow chart showing a method for transmitting system information according to another example. The method for transmitting system information may be applied to the communications system shown in FIG. 1. In this embodiment, system information broadcast by the base station to the terminal is referred to as first system information, and system information requested by the terminal from the base station is referred to as second system information. As shown in FIG. 3, the method for transmitting system information includes the following steps.

Step 301: A base station broadcasts first system information to a terminal by using a beamforming technology, where the first system information at least includes system information used by the base station and the terminal in a random access process.

The first system information is the most important system information and may include at least one type of system information or at least one type of information block. In one or more embodiments, the first system information at least includes the system information used by the base station and terminal in the random access process. For example, the first system information may include a System Frame Number (SFN) and bandwidth. Here, the first system information may also include an MIB, or include an SFN, bandwidth, and an SIBm, or include an MIB and k SIBS, where m is a positive integer of 1 to 12, and k is a positive integer of 1 to 11.

The terminal needs to access the base station by means of the random access process, and in the random access process, the terminal needs to send a preamble of the base station to the base station. So, if the terminal does not store the preamble of the base station, the base station may also add the preamble to the first system information and send the first system information to the terminal, and at this time, the first system information also includes the preamble. If the terminal stores the preamble of the base station, the first system information may not include the preamble.

When the terminal accesses the base station by means of a competition mechanism, the first system information carries a preamble sequence, where each preamble is a preamble used for access based on the competition mechanism; and when the terminal accesses the base station by means of a non-competition mechanism, the first system information carries a preamble allocated by the base station for the terminal, where the preamble is a preamble used for access based on the non-competition mechanism.

Step 302: The terminal receives the first system information broadcast by the base station by using the beamforming technology.

Step 303: In the random access process, the terminal sends a preamble to the base station.

When the terminal accesses the base station by means of the competition mechanism, the terminal randomly selects one preamble from the preamble sequence and sends the preamble on a Physical Random Access Channel (PRACH) to the base station.

Step 304: The base station listens to a preamble sent by each terminal.

The base station may listen to the preamble sent by each terminal on the PRACH.

Step S305: When a preamble sent by the terminal is detected, the base station generates a random access response message and sends the random access response message to the terminal, where the random access response message is used to instruct to send a random access message III.

Because multiple terminals might randomly select the same preamble and send the same preamble to the base station on the same uplink resource, the base station might not detect preambles sent by multiple terminals. Accordingly, the terminal sends the preamble to the base station again until the number of times that transmission is performed reaches the maximum number; alternatively, multiple terminals simultaneously send the same preamble to the base station on the same uplink resource, and the base station can detect the preamble, and in this case, the base station generates a random access response message and sends the random access response message to each terminal that sends the preamble; and alternatively, only one terminal sends a preamble to the base station at one time, and in this case, the base station may also detect the preamble, generate a random access response message, and send the random access response message to the terminal. The random access response message may be a Random Access Response (RAR).

The random access response message carries an index number of the preamble detected by the base station, time adjustment information used for uplink synchronization, an initial uplink resource indicator, a temporary Cell Radio Network Temporary Identifier (C-RNTI), and the like. The uplink resource indicator is used to instruct the terminal to send an uplink resource of the random access message III, and the temporary C-RNTI is determined whether to be converted to a permanent C-RNTI in the random access message IV.

Step 306: The terminal receives the random access response message sent by the base station after the base station detects the preamble.

When multiple terminals simultaneously send the preamble on the same uplink resource, each terminal can receive a random access response message, and all the random access response messages carry an index number of the preamble; and when one terminal sends the preamble to the base station, the terminal receives a random access response message, and the random access response message carries the index number of the preamble.

Step 307: The terminal sends the random access message III carrying a system information request to the base station, where the system information request is used to request for second system information, and the second system information is different from the first system information.

The second system information is information other than the first system information and may include at least one type of system information or at least one type of information block.

When determining that the index number of the preamble in the random access response message corresponds to the preamble sent by itself, the terminal sends the random access message III. The random access message III may be an msg3.

Sending the random access message III carrying the system information request to the base station includes: when the random access message III includes n information indicator bits, and each information indicator bit corresponds to at least one type of system information or at least one type of information block, determining an information indicator bit corresponding to the second system information from the n information indicator bits, and setting a numerical value of the information indicator bit to a preset numerical value, where the preset numerical value is used to instruct the base station to send the second system information, and n is a positive integer; and sending the random access message III to the base station.

Assuming that the first information indicator bit is used to instruct to obtain a System Information Block Type2 (SIB2), and a preset numerical value is 1, when the second system information that the terminal needs to obtain is the SIB2, the terminal sets a numerical value of the first information indicator bit to 1; and when the terminal does not need to obtain the SIB2, the terminal sets the numerical value of the first information indicator bit to 0. With regard to each information indicator bit in n information indicator bits, the terminal can set a numerical value of each information indicator bit in the foregoing manner.

It needs to be noted that the random access message III at least further includes an identifier of the terminal, so as to help the base station identify the terminal.

It needs to be noted that when multiple terminals simultaneously receive the same random access response message, every terminal sends a random access message III to the base station.

Step 308: The base station receives the random access message III carrying the system information request and sent by the terminal.

Step 309: The base station sends a random access message IV carrying the second system information to the terminal, where the random access message IV is used for the terminal to read the second system information.

When receiving multiple random access messages III, the base station determines, from the multiple random access messages III, a random access message III sent by a terminal of the detected preamble and generates a random access message IV; and when the base station only receives one random access message III and determines, according to an identifier of the terminal in the random access message III, that the terminal is the terminal that sends the preamble detected by itself, the base station generates a random access message IV. The random access message IV may be an msg4.

The method further includes: when the random access message III includes n information indicator bits, and each information indicator bit corresponds to at least one type of system information or at least one type of information block, reading a numerical value of each information indicator bit in the random access message III, where n is a positive integer; when an information indicator bit whose numerical value is a preset numerical value exits, obtaining second system information corresponding to the information indicator bit; and generating a random access message IV carrying the second system information.

When the random access message III is generated by the terminal according to step 307, the base station also reads a numerical value of each information indicator bit, and with regard to each information indicator bit whose numerical value is the preset numerical value, the base station reads second system information corresponding to the information indicator bit and generates a random access message IV carrying the second system information.

The example in step 307 is still used for description, and when a numerical value of the first information indicator bit read by the base station is 1, the base station determines that the terminal needs to obtain the SIB2 and adds the SIB2 to the random access message IV as the second system information.

It needs to be note that the random access message IV at least includes an identifier of a terminal, determined by a server, that can access the base station this time.

Step 310: The terminal receives the random access message IV carrying the second system information and sent by the base station.

Step 311: The terminal reads the second system information from the random access message IV.

The terminal further needs to determine whether it can access the base station according to an identifier of a terminal in the random access message IV. At this time, the terminal reads the identifier of a terminal in the random access message IV, and when the identifier of a terminal is the identifier of the terminal sent by the terminal in the random access message III, determines that the base station can be accessed this time, reads the second system information, and converts the temporary C-RNTI to a permanent C-RNTI, and the procedure is ended. When the identifier of a terminal is not the identifier of the terminal sent by the terminal in the random access message III, the terminal determines that the base station cannot be accessed this time and performs a random access process again until a maximum number of times, and the procedure is ended.

Figure 4:
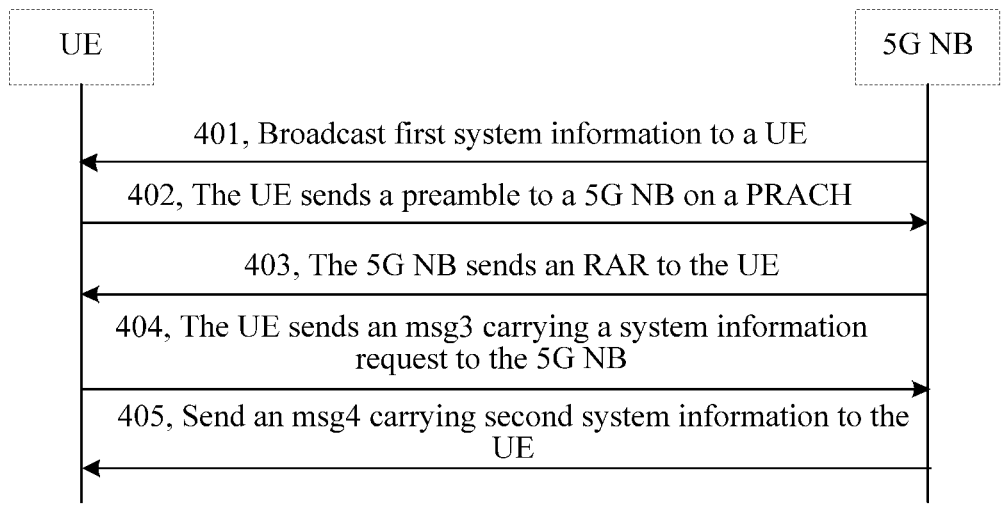
FIG. 4 is a schematic diagram illustrating a method for transmitting system information according to another example.

Refer to FIG. 4, which shows a procedure of a method for transmitting system information, where an example where a terminal is a user equipment (UE) and a base station is a 5G Node B (NB) is used for description.

Step 401: A 5G NB broadcasts first system information to a UE.

Step 402: The UE sends a preamble to the 5G NB on a PRACH.

Step 403: The 5G NB sends an RAR to the UE.

Step 404: The UE sends an msg3 carrying a system information request to the 5G NB.

Step 405: The 5G NB sends an msg4 carrying second system information to the UE.

Steps 301, 304, 305, 308, and 309 may be separately implemented as a so-called method for transmitting system information on a base station side, and steps 302, 303, 306, 307, 310, and 311 may be separately implemented as a so-called method for transmitting system information on a terminal side.

In conclusion, according to a method for transmitting system information provided by the present disclosure, a terminal may request a base station for second system information by sending, by the terminal, a random access message III carrying a system information request to the base station, where the system information request is used to request for the second system information, sending, by the base station, a random access message IV carrying the second system information to the terminal, and reading, by the terminal, the second system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the second system information to the terminal by using an existing random access message IV, thereby resolving a problem of signaling waste caused by sending, by the terminal, a single system information request to the base station and sending, by the base station, a single piece of second system information to the terminal in reply, and producing an effect of saving signaling.

Figure 5:
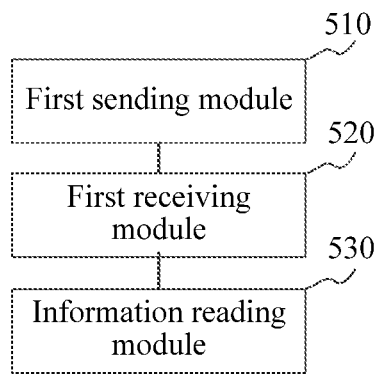
FIG. 5 is a block diagram of an apparatus for transmitting system information according to an example.

FIG. 5 is a block diagram of an apparatus for transmitting system information, according to an example. The apparatus for transmitting system information may be applied to the terminal shown in FIG. 1, and as shown in FIG. 5, the apparatus for transmitting system information includes a first sending module 510, a first receiving module 520, and an information reading module 530. The first sending module 510 may include a transmitter while the first receiving module 520 may include a receiver.

The first sending module 510 is configured to send, in a random access process, a random access message III carrying a system information request to a base station, where the system information request is used to request for system information.

The first receiving module 520 is configured to receive a random access message IV carrying the system information and sent by the base station.

The information reading module 530 is configured to read the system information from the random access message IV obtained by the first receiving module 520.

In conclusion, according to an apparatus for transmitting system information provided by the present disclosure, a terminal may request a base station for system information by sending, by the terminal, a random access message III carrying a system information request to the base station, where the system information request is used to request for the system information, sending, by the base station, a random access message IV carrying the system information to the terminal, and reading, by the terminal, the system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

Figure 6:
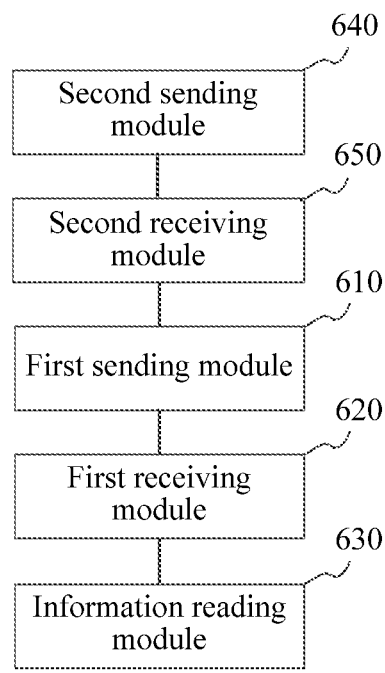
FIG. 6 is a block diagram of an apparatus for transmitting system information according to an example.

FIG. 6 is a block diagram of an apparatus for transmitting system information according to an example. The apparatus for transmitting system information may be applied to the terminal shown in FIG. 1, and as shown in FIG. 6, the apparatus for transmitting system information includes a first sending module 610, a first receiving module 620, and an information reading module 630.

The first sending module 610 is configured to send, in a random access process, a random access message III carrying a system information request to a base station, where the system information request is used to request for system information.

The first receiving module 620 is configured to receive a random access message IV carrying the system information and sent by the base station.

The information reading module 630 is configured to read the system information from the random access message IV obtained by the first receiving module 620.

Optionally, the first sending module 610 is further configured to: when the random access message III includes n information indicator bits, and each information indicator bit corresponds to at least one type of system information or at least one type of information block, determine an information indicator bit corresponding to the system information from the n information indicator bits, and set a numerical value of the information indicator bit to a preset numerical value, where the preset numerical value is used to instruct the base station to send the system information, and n is a positive integer; and send the random access message III to the base station.

Optionally, the apparatus further includes: a second sending module 640 and a second receiving module 650.

The second sending module 640 is configured to send, in the random access process, a preamble to the base station.

The second receiving module 650 is configured to receive a random access response message sent by the base station after the base station detects the preamble, where the random access response message is used to instruct to send the random access message III.

In conclusion, according to an apparatus for transmitting system information provided by the present disclosure, a terminal may request a base station for system information by sending, by the terminal, a random access message III carrying a system information request to the base station, where the system information request is used to request for the system information, sending, by the base station, a random access message IV carrying the system information to the terminal, and reading, by the terminal, the system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

Figure 7:
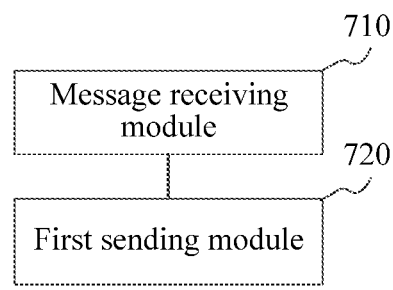
FIG. 7 is a block diagram of an apparatus for transmitting system information according to an example.

FIG. 7 is a block diagram of an apparatus for transmitting system information according to an example. The apparatus for transmitting system information may applied to the base station shown in FIG. 1, and as shown in FIG. 7, the apparatus for transmitting system information includes a message receiving module 710 and a first sending module 720.

The message receiving module 710 is configured to receive, in a random access process, a random access message III carrying a system information request and sent by a terminal, where the system information request is used to request for system information.

The first sending module 720 is configured to send a random access message IV carrying the system information to the terminal, where the random access message IV is used for the terminal to read the system information.

In conclusion, according to an apparatus for transmitting system information provided by the present disclosure, a terminal may request a base station for system information by sending, by the terminal, a random access message III carrying a system information request to the base station, where the system information request is used to request for the system information, sending, by the base station, a random access message IV carrying the system information to the terminal, and reading, by the terminal, the system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

Figure 8:
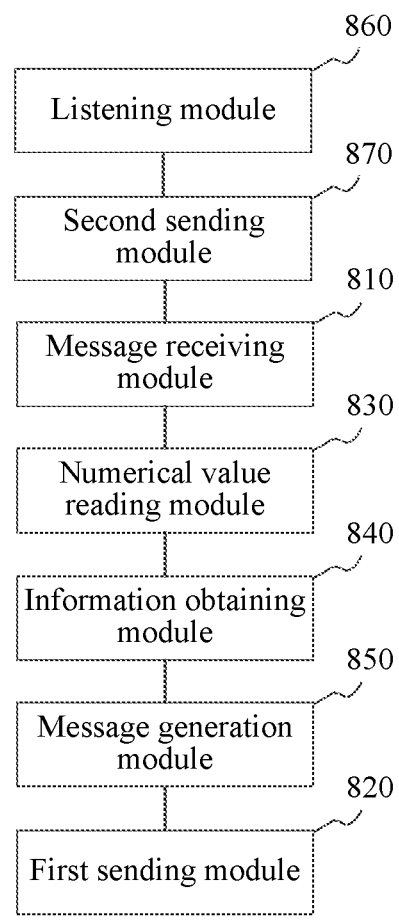
FIG. 8 is a block diagram of an apparatus for transmitting system information according to an example.

FIG. 8 is a block diagram of an apparatus for transmitting system information according to an example. The apparatus for transmitting system information may be applied to the base station shown in FIG. 1, and as shown in FIG. 8, the apparatus for transmitting system information includes a message receiving module 810 and a first sending module 820.

The message receiving module 810 is configured to receive, in a random access process, a random access message III carrying a system information request and sent by a terminal, where the system information request is used to request for system information.

The first sending module 820 is configured to send a random access message IV carrying the system information to the terminal, where the random access message IV is used for the terminal to read the system information.

Optionally, the apparatus further includes a numerical value reading module 830, an information obtaining module 840, and a message generation module 850.

The numerical value reading module 830 is configured to, when the random access message III includes n information indicator bits, and each information indicator bit corresponds to at least one type of system information or at least one type of information block, read a numerical value of each information indicator bit in the random access message III, where n is a positive integer.

The information obtaining module 840 is configured to, when an information indicator bit whose numerical value is a preset numerical value exits, obtain system information corresponding to the information indicator bit.

The message generation module 850 is configured to generate a random access message IV carrying the system information.

Optionally, the apparatus further includes: a listening module 860 and a second sending module 870.

The listening module 860 is configured to listen to, in the random access process, a preamble sent by each terminal.

The second sending module 870 is configured to, when the listening modules 860 detects a preamble sent by the terminal, generate a random access response message and send the random access response message to the terminal, where the random access response message is used to instruct to send the random access message III.

In conclusion, according to an apparatus for transmitting system information provided by the present disclosure, a terminal may request a base station for system information by sending, by the terminal, a random access message III carrying a system information request to the base station, where the system information request is used to request for the system information, sending, by the base station, a random access message IV carrying the system information to the terminal, and reading, by the terminal, the system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

With respect to the apparatuses in the above embodiments, the specific manners for performing operations for individual modules therein have been described in detail in the embodiments regarding the methods, which will not be elaborated herein.

An example of the present disclosure provides an apparatus for transmitting system information, which can implement the method for transmitting system information provided by the present disclosure, and the apparatus for transmitting system information includes: a processor and a memory for storing instructions executable by the processor.

The processor is configured to: send, in a random access process, a random access message III carrying a system information request to a base station, where the system information request is used to request for system information; receive a random access message IV carrying the system information and sent by the base station; and read the system information from the random access message IV.

An example of the present disclosure provides an apparatus for transmitting system information, which can implement the method for transmitting system information provided by the present disclosure, and the apparatus for transmitting system information includes: a processor and a memory for storing instructions executable by the processor.

The processor is configured to: receive, in a random access process, a random access message III carrying a system information request and sent by a terminal, where the system information request is used to request for system information; and send a random access message IV carrying the system information to the terminal, where the random access message IV is used for the terminal to read the system information.

Figure 9:
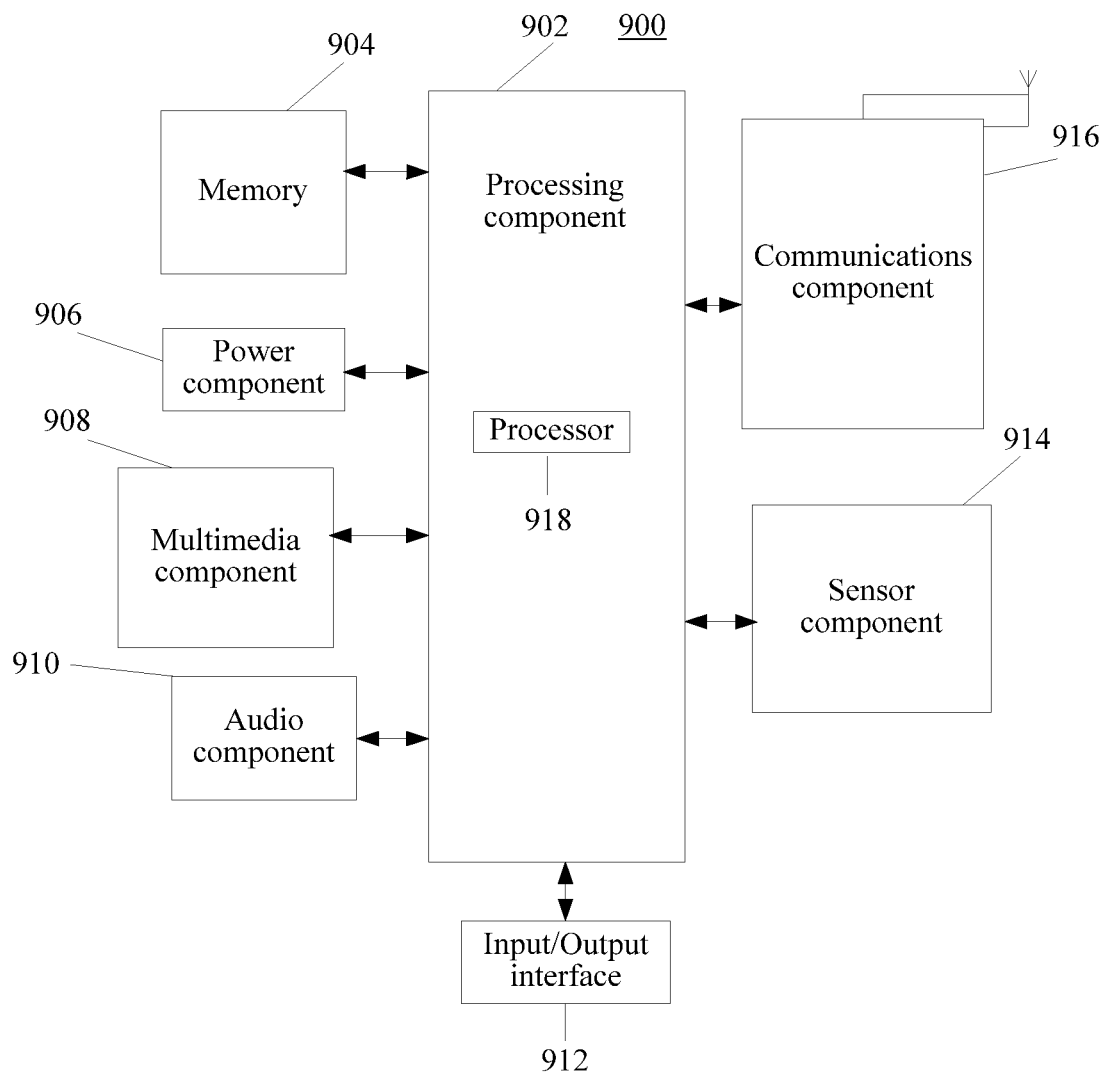
FIG. 9 is a block diagram of an apparatus for transmitting system information according to an example.

FIG. 9 is a block diagram of an apparatus 900 for transmitting system information according to an example. For example, the device 900 may be a mobile phone, a computer, a digital broadcast terminal, a messaging device, a gaming console, a tablet, a medical device, exercise equipment, a personal digital assistant, and the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communications component 916.

The processing component 902 typically controls overall operations of the apparatus 900, such as the operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communications component 916. In some embodiments, the audio component 910 further includes a speaker to output audio signals.

The I/O interface 912 provides an interface between the processing component 902 and peripheral interface modules, such as a keyboard, a click wheel, buttons, and the like.

The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communications component 916 is configured to facilitate communication, wired or wirelessly, between the apparatus 900 and other apparatuses. The apparatus 900 can access a wireless network based on a communications standard, such as WiFi, 2G, or 3G, or a combination thereof. In one example, the communications component 916 receives a broadcast signal or broadcast associated information from an external broadcast management system via a broadcast channel. In one example, the communications component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 900 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 904, executable by the processor 918 in the apparatus 900, for performing the above-described methods. For example, the non-transitory computer-readable storage medium may be a ROM, a Random-Access Memory (RAM), a CD-ROM, a magnetic tape, a floppy disc, an optical data storage apparatus, and the like.

The technical solutions provided by the embodiments of the present disclosure may include the following beneficial effects.

A terminal may request a base station for system information by sending, by the terminal, a random access message III carrying a system information request to the base station, where the system information request is used to request for the system information, sending, by the base station, a random access message IV carrying the system information to the terminal, and reading, by the terminal, the system information from the random access message IV, thereby resolving a problem of signaling waste caused by broadcasting, by the base station, the system information to the terminal by using the beamforming technology for many times. Moreover, the terminal may add the system information request to an existing random access message III and send the random access message III to the base station, and the base station may further feed back the system information to the terminal by using an existing random access message IV, thereby resolving a problem of signaling waste caused by sending, by the terminal, a single system information request to the base station and sending, by the base station, a single piece of system information to the terminal in reply, and producing an effect of saving signaling.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting system information, implemented by a terminal, comprising:

receiving first system information broadcasted by a base station using a beamforming technology, the first system information being used by the base station and the terminal in a random access process;

sending, in the random access process, a preamble to the base station;

receiving a random access response message sent by the base station after the base station detects the preamble, wherein the random access response message is used to instruct to send a random access message III (msg3), the random access message III being msg3 in a 4-step random access procedure and comprising at least a first identifier of the terminal;

sending the random access message III carrying a system information request to the base station, wherein the system information request is used to request for second system information;

receiving a random access message IV (msg4) carrying the second system information and sent by the base station, wherein the random access message IV is msg4 in the 4-step random access procedure and is generated by the base station upon determining that the terminal corresponding to the first identifier in the random access message III is the terminal sending the preamble, and the random access message IV comprises at least a second identifier of a terminal being able to access the base station; and reading the second identifier from the random access message IV, when the second identifier in the random access message IV is same as the first identifier in the random access message III sent by the terminal, determining by the terminal that the base station is accessible, reading the second system information from the random access message IV and converting a temporary Cell Radio Network Temporary Identifier (C-RNTI) in the random access response message to a permanent C-RNTI and terminating the random access process, and when the second identifier in the random access message IV is different from the first identifier in the random access message III sent by the terminal, determining that the base station is not accessible, repeating the random access process until a maximum number of times is reached and then terminating the random access process;

wherein transmission between the base station and the terminal is performed by using a high frequency band, and the first system information is different from the second system information.

2. The method according to claim 1, wherein sending the random access message III carrying the system information request to the base station comprises:

when the random access message III comprises n information indicator bits, and each information indicator bit corresponds to at least one type of system information or at least one type of information block, determining an information indicator bit corresponding to the second system information from the n information indicator bits, and setting a numerical value of the information indicator bit to a preset numerical value, wherein the preset numerical value is used to instruct the base station to send the second system information, and n is a positive integer; and sending the random access message III to the base station.

3. A method for transmitting system information, implemented by a base station, comprising:

broadcasting first system information by using a beamforming technology, the first system information being used by the base station and a terminal in a random access process;

listening to, in the random access process, a preamble sent by a terminal;

when the preamble sent by the terminal is detected, generating a random access response message and sending the random access response message to the terminal, wherein the random access response message is used to instruct to send a random access message III (msg3), the random access message III being msg3 in a 4-step random access procedure and comprising at least a first identifier of the terminal;

receiving the random access message III carrying a system information request and sent by the terminal, wherein the system information request is used to request for second system information; and generating, upon determining that the terminal corresponding to the first identifier in the random access message III is the terminal sending the preamble, a random access message IV (msg4) carrying the second system information and sending the random access message IV to the terminal, wherein the random access message IV is msg4 in the 4-step random access procedure and is used for the terminal to read the second system information and the random access message IV comprises at least a second identifier of a terminal being able to access the base station, wherein when the second identifier in the random access message IV is same as the first identifier in the random access message III sent by the terminal, the base station is determined by the terminal to be accessible, a temporary Cell Radio Network Temporary Identifier (C-RNTI) in the random access response message is converted to a permanent C-RNTI and the random access process is terminated, and when the second identifier in the random access message IV is different from the first identifier in the random access message III sent by the terminal, the base station is determined by the terminal to be not accessible, the random access process is repeated until a maximum number of times is reached and then the random access process is terminated;

wherein transmission between the base station and the terminal is performed by using a high frequency band, and the first system information is different from the second system information.

4. The method according to claim 3, further comprising:

when the random access message III comprises n information indicator bits, and each information indicator bit corresponds to at least one type of system information or at least one type of information block, reading a numerical value of each information indicator bit in the random access message III, wherein n is a positive integer;

when an information indicator bit whose numerical value is a preset numerical value exits, obtaining the second system information corresponding to the information indicator bit; and generating the random access message IV carrying the second system information.

5. An apparatus for transmitting system information, comprising:

a processor;

a memory configured to store instructions executable by the processor;

wherein the processor is configured to:

receive first system information broadcasted by a base station using a beamforming technology, the first system information being used by the base station and a terminal in a random access process;

send, in the random access process, a preamble to the base station;

receive a random access response message sent by the base station after the base station detects the preamble, wherein the random access response message is used to instruct to send a random access message III (msg3), the random access message III being msg3 in a 4-step random access procedure and comprising at least a first identifier of the terminal;

send the random access message III carrying a system information request to the base station, wherein the system information request is used to request for second system information;

receive a random access message IV (msg4) carrying the second system information and sent by the base station, wherein the random access message IV is msg4 in the 4-step random access procedure and is generated by the base station upon determining that the terminal corresponding to the first identifier in the random access message III is the terminal sending the preamble, and the random access message IV comprises at least a second identifier of a terminal being able to access the base station; and read the second identifier from the random access message IV, when the second identifier in the random access message IV is same as the first identifier in the random access message III sent by the terminal, determine by the terminal that the base station is accessible, read the second system information from the random access message IV and convert a temporary Cell Radio Network Temporary Identifier (C-RNTI) in the random access response message to a permanent C-RNTI and terminate the random access process, and when the second identifier in the random access message IV is different from the first identifier in the random access message III sent by the terminal, determine that the base station is not accessible, repeat the random access process until a maximum number of times is reached and then terminate the random access process;

wherein transmission between the base station and the terminal is performed by using a high frequency band, and the first system information is different from the second system information.

6. The apparatus according to claim 5, wherein the processor configured to send a random access message III carrying a system information request to a base station is configured to:

when the random access message III comprises n information indicator bits, and each information indicator bit corresponds to at least one type of system information or at least one type of information block, determine an information indicator bit corresponding to the second system information from the n information indicator bits, and set a numerical value of the information indicator bit to a preset numerical value, wherein the preset numerical value is used to instruct the base station to send the second system information, and n is a positive integer; and send the random access message III to the base station.

7. An apparatus for transmitting system information, comprising:

a processor;

a memory configured to store instructions executable by the processor;

wherein the processor is configured to:

broadcast first system information by using a beamforming technology, the first system information being used by a base station and a terminal in a random access process;

listen to, in the random access process, a preamble sent by a terminal;

when the preamble sent by the terminal is detected, generate a random access response message and send the random access response message to the terminal, wherein the random access response message is used to instruct to send a random access message III (msg3), the random access message III being msg3 in a 4-step random access procedure and comprising at least a first identifier of the terminal;

receive the random access message III carrying a system information request and sent by the terminal, wherein the system information request used to request for second system information; and generate, upon determining that the terminal corresponding to the first identifier in the random access message III is the terminal sending the preamble, a random access message IV (msg4) carrying the second system information and send unicast the random access message IV to the terminal, wherein the random access message IV is msg4 in the 4-step random access procedure and is used for the terminal to read the second system information and the random access message IV comprises at least a second identifier of a terminal being able to access the base station, wherein when the second identifier in the random access message IV is same as the first identifier in the random access message III sent by the terminal, the base station is determined by the terminal to be accessible, a temporary Cell Radio Network Temporary Identifier (C-RNTI) in the random access response message is converted to a permanent C-RNTI and the random access process is terminated, and when the second identifier in the random access message IV is different from the first identifier in the random access message III sent by the terminal, the base station is determined by the terminal to be not accessible, the random access process is repeated until a maximum number of times is reached and then the random access process is terminated;

wherein transmission between the base station and the terminal is performed by using a high frequency band, and the first system information is different from the second system information.

8. The apparatus according to claim 7, wherein the processor is further configured to:

when the random access message III comprises n information indicator bits, and each information indicator bit corresponds to at least one type of system information or at least one type of information block, read a numerical value of each information indicator bit in the random access message III, wherein n is a positive integer;

when an information indicator bit whose numerical value is a preset numerical value exits, obtain the second system information corresponding to the information indicator bit; and generate the random access message IV carrying the second system information.

\* \* \* \* \*